(12) United States Patent
Gou et al.

(10) Patent No.: US 12,497,588 B2
(45) Date of Patent: Dec. 16, 2025

(54) DEVICE AND METHOD FOR SEPARATING AND RECOVERING INTESTINAL CONTENTS AND EXTRACT THEREOF

(71) Applicant: L&G Biotechnology (Yangzhou) Co., Ltd, Yanghzou (CN)

(72) Inventors: Zhenhui Gou, Yanghzou (CN); Qi Luo, Yanghzou (CN)

(73) Assignee: L&G Biotechnology (Yangzhou) Co., Ltd, Yanghzou (CN)

( * ) Notice: Subject to any disclaimer, the term of this patent is extended or adjusted under 35 U.S.C. 154(b) by 335 days.

(21) Appl. No.: 17/286,672

(22) PCT Filed: May 14, 2020

(86) PCT No.: PCT/CN2020/090333
§ 371 (c)(1),
(2) Date: Apr. 19, 2021

(87) PCT Pub. No.: WO2021/135037
PCT Pub. Date: Jul. 8, 2021

(65) Prior Publication Data
US 2022/0306982 A1   Sep. 29, 2022

(30) Foreign Application Priority Data

Dec. 30, 2019   (CN) .......................... 201911397694.6

(51) Int. Cl.
*C12M 1/02* (2006.01)
*B01D 61/18* (2006.01)
(Continued)

(52) U.S. Cl.
CPC .............. *C12N 1/02* (2013.01); *C12M 25/02* (2013.01); *B01D 61/18* (2013.01); *B01D 63/087* (2013.01); *B01D 69/02* (2013.01)

(58) Field of Classification Search
CPC . C12N 1/02; C12N 1/20; C12M 25/02; B01D 2313/14; B01D 2315/10;
(Continued)

(56) References Cited

U.S. PATENT DOCUMENTS

| 4,644,056 A | * | 2/1987 | Kothe ..................... A23J 1/202 |
| | | | 530/832 |
| 5,792,354 A | * | 8/1998 | Aksberg ............... B01D 29/085 |
| | | | 216/101 |

(Continued)

FOREIGN PATENT DOCUMENTS

| CN | 101973664 A | 2/2011 |
| CN | 204079633 U | 1/2015 |

(Continued)

OTHER PUBLICATIONS

English language machine translation of CN108676704A, 8 pages, No Date.*

(Continued)

*Primary Examiner* — Pranav N Patel
(74) *Attorney, Agent, or Firm* — Getech Law LLC; Jun Ye (57) ABSTRACT

A device and method for separating and recovering intestinal contents, comprising removing the impurities from the intestinal contents by means of coarse filtration and cross-flow fine filtration, followed by obtaining a concentrate by microporous membrane cross-flow filter, and collecting the target contents. The microporous membrane has a spongy porous structure, and can rapidly and effectively achieve the separation and recovery of flora from the intestinal contents by cooperation with cross-flow filtration. The separated and recovered dry flora comprises at least 10-20% of the initial wet intestinal contents, and comprises at least $10^{11}/1$ g dry flora.

5 Claims, 7 Drawing Sheets

(51) Int. Cl.
  *C12M 1/12*  (2006.01)
  *C12N 1/02*  (2006.01)
  *B01D 63/08*  (2006.01)
  *B01D 69/02*  (2006.01)

(58) Field of Classification Search
  CPC .......... B01D 2325/02; B01D 2325/026; B01D 2325/02833; B01D 2325/02834; B01D 61/18; B01D 63/087; B01D 69/02; Y02A 50/30
  See application file for complete search history.

(56) References Cited

U.S. PATENT DOCUMENTS

| | | | | |
|---|---|---|---|---|
| 5,798,041 | A * | 8/1998 | Zuk, Jr. | B01D 61/20 |
| | | | | 210/435 |
| 2016/0177252 | A1 * | 6/2016 | Peters | A61L 2/0017 |
| | | | | 210/651 |

FOREIGN PATENT DOCUMENTS

| | | |
|---|---|---|
| CN | 204411879 U | 6/2015 |
| CN | 105624024 A | 1/2016 |
| CN | 106396267 A | 2/2017 |
| CN | 108676704 A | 10/2018 |

OTHER PUBLICATIONS

PCT/CN2020/090333, International Search Report and Written Opinion, mailed Sep. 21, 2020, 10 pages. (no English translation).

\* cited by examiner

DEVICE AND METHOD FOR SEPARATING AND RECOVERING INTESTINAL CONTENTS AND EXTRACT THEREOF

TECHNICAL FIELD

The present invention relates to the technical field of medical application, especially to a device and method for separating and recovering intestinal contents, and an extract thereof.

BACKGROUND

The intestinal flora of mammals is an important metabolic and immune "organ" in mammals, which affects the overall metabolism of the host. Host metabolism is affected by its own genes and intestinal flora genes. A "co-metabolism" process exists between the host and the flora. Intestinal bacteria can participate in the metabolism of the host and have a co-metabolic relationship with the host. Under normal circumstances, the intestinal flora is relatively constant in mammals. Once the intestinal flora alters, it will cause a dysfunction of the host immune system, thereby causing diseases.

There are a large number of symbiotic microorganisms in the body of human. Most of them live in the human intestinal tract, and have a number of more than 1000 trillion ($10^{14}$), which is more than 10 times of the total number of human cells. More than 99% of intestinal microorganisms are bacteria, including most anaerobic bacteria and a small amount of aerobic bacteria. Intestinal microorganisms are important participants in human metabolism, providing substrates, enzymes and energy for human metabolic process. Meanwhile, fatty acids produced by metabolism promote the growth and differentiation of human epithelial cells, and participate in the synthesis of vitamins and the absorption of various ions. Because the intestinal tract is the largest immune organ in the human body, the communication between intestinal microorganisms and host on the surface of intestinal mucosa promotes the establishment and development of the immune system and becomes an important immune barrier of human body. In addition, intestinal microorganisms also provide a protective function for human body by forming a "membrane barrier".

Human intestinal microorganisms are always accompanied by human growth, which not only helps the digestion of food, but also serves as a barrier for effectively resisting against the invasion of external pathogens. The balanced and stable intestinal microecological environment formed in the long evolutionary process plays a crucial role in human nutrition, metabolism and immunity. In the long process of evolution, intestinal microorganisms and human have reached a good cooperation, which plays a crucial role in human nutrition, metabolism and immunity.

Various bacteria in the intestinal tract can function when the number thereof reaches a relative equilibrium. This equilibrium is very fragile. If abdominal pain or diarrhea occurs, it is likely that the equilibrium of intestinal flora is disrupted. Malnutrition, obesity, diabetes and the like are likely to be associated with the imbalance of intestinal flora. Recent research indicates that Alzheimer's disease and Autism may also be associated with the imbalance of intestinal flora.

In December 2013, Science journal published ten scientific advances, wherein the research on the relationship between intestinal flora and human health is included. The intestinal microbial flora is very complex. The intestinal flora composed of a certain proportion of mutually restricted and interdependent intestinal flora forms a symbiotic and mutually beneficial ecological balance with the host in quantity. Diet and probiotics supplement can produce a certain effect or influence on intestinal microbial flora. However, although improving the diet structure can achieve the purpose of improving the intestinal micro-ecology equilibrium, it is slow and time-consuming. As compared with the variety of intestinal flora, it is difficult to restore the overall equilibrium of intestinal micro-ecology by supplement of probiotics with limited quantity and species, and the therapeutic effect is limited. In recent years, as an important new technology in the medical field, fecal flora transplantation (FMT) is used to reconstruct the intestinal flora, and has been gradually identified and clinically concerned.

The feces of mammals, such as human, include mainly undigested residues (such as, food fiber), intestinal secretions (including mucus), proteins, white blood cells, epithelial cells, bacteria, inorganic substances (mainly calcium and phosphate), indigestible or unabsorbable food, water, and the like. Most of the normal adults defecate once per day. The excreted feces will also change along with the type of food, the food consumption, and the functional status of digestive organs. For example, those mainly ingesting fine grain and meat have fine feces in little amount; after uptaking coarse grains, especially a large number of vegetables, their feces are coarse and large due to the high fiber quality.

There are a lot of bacteria in feces, accounting for 1/3 of the dry weight and mostly belonging to normal flora. The healthy infant's feces include mainly *Bifidobacterium, Bacteroides*, enterobacteria, *Enterococcus, Staphylococcus* and so on. *Escherichia coli*, anaerobes and enterococci are the main flora in adult feces, accounting for about 80%; and *Aerogenes, Proteus, Pseudomonas aeruginosa* and other bacteria are mostly passing bacteria, accounting for less than 10%. The total amount of Sporeforms (e.g. *Clostridium*) and yeasts is not more than 10%. The amount and spectrum of bacteria in feces are relatively stable at ordinary time, and keep ecological equilibrium with the host (*Clinical Laboratory Diagnosis and Clinical Application*, edited by Wang Ruihui, Changchun: Jilin Science and Technology Press, March 2017).

By transferring a fecal flora (intestinal flora) from feces of healthy people to patients, FMT can allow patients to obtain an intestinal flora of healthy people, so as to regulate the imbalance of intestinal flora, and reconstruct an intestinal micro-ecosystem with normal functions, thereby providing help for treatment of intestinal and extra-intestinal diseases. In the FMT therapy adopted by modern people, the fecal flora as used is mostly a fresh solution of fecal bacteria, or a fecal liquid, or a fermented fecal solution, or a children's fecal solution. "Huang Long Decoction" called by ancient Chinese doctors is a formulation including human fecal solution. In addition to the great psychological challenges faced by both medical staff and patients, the more important issue in FMT with fecal bacterial solution is how to complete the separation and preservation of fecal bacteria in a time period that would not affect the function of the flora.

There are at least 1,000 to 1,150 types of bacteria in human intestinal tracts, and there are about 160 types of dominant bacteria in average in each host. Although the main populations of human intestinal flora are very similar, there are great differences in the relative contents and strain types of different microbial populations among different host individuals. The factors that affect the differences of microbial flora include the location, age, physiological status, dietary habits of the host, etc. Although human fecal bacteria are the only organ that can be truly shared by human beings, it is not required to consider the problem of immune rejection. However, the ecological equilibrium of intestinal flora in each individual is indeed different, or even quite different. This also increases the difficulty of FMT to a certain extent.

One of the key points of FMT is the preparation of fecal bacteria to be transplanted, mostly fecal bacteria liquid at present. However, there is no consensus on the preparation of fecal bacteria liquid. Many factors can affect the preparation of fecal bacteria liquid. First, fecal volume: since the fecal weight is not directly proportional to the number of flora and have large individual differences, there is no unified standard to determine the fecal volume when preparing a solution of fecal bacteria. Second, preparation time: fecal bacteria contains a lot of anaerobic bacteria, each of which has different metabolic time. Therefore, it is necessary to complete the separation and extraction as soon as possible, otherwise it is easy to cause the death of anaerobic bacteria and the huge change of the relative abundance of bacteria species, thereby affecting the clinical treatment effect. Third, the current preparation processes and methods include mainly manual coarse filtration plus centrifugal enrichment, or microfiltration plus centrifugal enrichment. As compared with the initial distribution of flora in intestinal contents, the species and abundance of flora obtained by the current preparation methods are different, and have poor repeatability. Fourth, the state of fecal bacteria liquid: there are fresh fecal bacteria liquid and freeze-dried fecal bacteria liquid, wherein the freeze-dried fecal bacteria liquid is prepared by adding glycerol into the fresh fecal bacteria liquid, followed by cryogenic freezing at low temperature, or it can also be prepared into frozen fecal bacteria capsules.

Currently, multistage filtration is commonly used to remove other impurities in the automatic separation and recovery system of fecal bacteria, and has been disclosed in some prior arts in China, such as CN103330961B, CN105624024B and CN204097475U, etc. However, these fecal bacteria separation and recovery systems only involve separating the large impurity particles (e.g., undigested food residues or the like) from the fecal solution to give a bacterial solution which includes a large number of food residues, bacterial metabolites and water. Currently, in the common method, the mixed solution from which the large particles have been filtered is subjected to layer separation by centrifugation of a centrifuge, and the supernatant or the deposit is disposed to keep the useful flora. Most of the intestinal bacteria have a size between 0.1 and 50 µm. Disposal of the supernatant will lead to the loss of a large number of small-sized microorganisms, while disposal of the deposit with keeping the supernatant will lead to the loss of large-sized microorganisms. In turn, due to the diversity and complexity of fecal sample components, as well as the difference of each individual's operation, this method has great differences and uncontrollable results, a standardized repeatable operation cannot be achieved, and the operation is very inconvenient.

In addition, these methods cannot selectively mesh specific intestinal microorganisms due to the poor controllability, and thus cannot meet the requirements for the accurate treatment of intestinal diseases in the future. Meanwhile, fine filtration is performed by means of traditional mesh filtration in such devices to remove the relatively smaller impurities. Because the fine mesh filter has a mesh size of 0.01 mm to 1 mm, it is very easy to be blocked by impurities, thereby significantly reducing the filtering efficiency. Moreover, the higher level of viscous components in the feces causes a reduction of the filtering efficiency of the traditional screen filtration, so that it is impossible to realize the separation and extraction of flora in the effective time. The feces have a large amount of bacteria, while the existing patented technology of multi-stage filtration gives a low bacterial content per unit volume, and has poor operation repeatability and poor consistency of flora and sample, thereby increasing the difficulty of flora transplantation.

WO2012122478A1 discloses a composition of extract of human feces. By passing the blended sample through a sieve with a mesh size of no more than 2.0 mm, the filter liquor can be collected in a centrifuge tube and centrifuged for 10 minutes. The supernatant is removed, while the cells are re-suspended in the diluent and centrifuged for additional 10 minutes. The final supernatant is discarded and the cells are re-suspended in an aqueous solution to obtain the composition. The method in this art leads to loss of a large number of bacteria, and operation in the air will lead to death of a large number of anaerobic bacteria.

WO2016065777A1 discloses a device for separating microorganisms from the contents of a cavity. In the device, an outlet of a starting material tank is connected with an inlet of a stage filter consisting of one or more stage filter bottles; an outlet of a liquid storage tank is connected with a liquid feeding inlet of the starting material tank and at least one stage filter bottle; the material inlet of a sealed isolate tank is connected with the material outlet of the stage filter; the bacterial solution inlet of the first sub bottling device of a sub-packing device consisting of at least one sub bottling bottle is connected with the bacterial liquid outlet of the isolate tank; an odor inlet of a deodorizing device is connected with the odor outlet of the starting material tank and the odor outlet of the isolation tank via an odor pipeline, respectively; and at least one gas pump is arranged on the odor pipeline for directing the odor in the starting tank and the isolation tank into the deodorization device, respectively; the separation device helps filtration by means of vibration methods of shaking, sloshing or fluctuating the liquid in the stage filter bottle.

WO2016201114A1 discloses a method of preparing an oral composition for flora recovery therapy (MRT), including: collecting a fecal sample; purifying the fecal sample to form a purified intermediate, wherein purifying the fecal sample includes: adding a diluent to the fecal sample; mixing the fecal sample with a diluent to form a mixture; filtering the mixture; transferring the filtered liquor from the filtering step into a centrifuge tube; centrifuging the filtered liquor to obtain the purified intermediate; lyophilizing the purified intermediate to form a plurality of freeze-dried pellets; and encapsulating the plurality of freeze-dried pellets in one or more capsules.

CN201810852561.2 discloses a device, method and product of separation and recovery of intestinal contents thereof, in which the intestinal microorganisms are extracted by a microporous membrane separation module involving a combination of side wall filtration with rotary separation technology, instead of the traditional centrifugal separation technology. It utilizes the filtering characteristics of nuclear pore membrane, and in the application for separating the intestinal contents, the nuclear pore membrane entraps the desired product(s) by collecting different types of intestinal contents via filtration by nuclear pore membrane having different pore sizes. As an earlier invention of the inventor, the present invention has a great improvement in obtaining intestinal microorganisms as compared with the centrifugal operation. However, as the impurity removal stage still utilizes the conventional filtration method, the intestinal microorganisms are finally collected by a nuclear pore membrane, the nuclear pore membrane has a membrane structure with generally uniform pore sizes, and a negative pressure is required to be applied onto the lower end thereof to carry out cross-flow filtration, and thus, the overall filtration efficiency and the quality of the resultant intestinal microorganisms are still to be improved.

The current extraction of fecal flora is mostly performed by centrifugation process. However, during the process of centrifugation, the results of each stratification are different due to the differences of intestinal contents, including the composition and abundance of various food residues, bacteria in feces, etc., and each layer separation of the lost bacteria is different. Even if the centrifugal process utilizes the same parameters, such as, rotation speed and solid-liquid ratio, the quality of the final resultant flora products cannot be controlled, and it is unlikely to achieve an effective repeatability. Moreover, the operational process involves manual operations, so that the repeatability of the overall process faces great challenges.

Secondly, the extraction efficiency is generally very low, and the intestinal bacteria are significantly lost in the extraction process, thereby resulting in the limited number of extracted bacteria, and thus reducing the therapeutic effect of FMT and increasing the cost of FMT.

Simultaneously, the fecal flora needs to undergo multiple processes. Because the fecal flora are mainly anaerobic bacteria, it needs to be centrifuged in a bioengineering cupboard under nitrogen, and thus the operation becomes difficult. Since not all the operations can be performed in a bioengineering cupboard under nitrogen, it is hard to ensure the quality, and the therapeutic effect is not stable.

Therefore, the lack of standardized fecal bacteria separation and transplantation technology in the art is one of the key reasons that restrict the development of FMT. How to rapidly and efficiently separate fecal bacteria, ensure its repeatability and standardization, and ensure the consistency between the resultant fecal bacteria and fecal flora of the initial sample, is of great significance for fecal bacteria separation. There is a need for a device for separating and recovering intestinal contents and a method for separating and recovering intestinal contents, to effectively solve the problems involved in the above centrifugal separation and eliminate or decrease all or part of the defects in the prior art.

SUMMARY OF THE INVENTION

With respect to the problems in the prior art, the object of the present invention is to provide a device for separating and recovering intestinal contents, which can effectively, precisely, and controllably collect specific intestinal flora by use of cross-flow filtration with microporous membrane ultra-fine module.

Meanwhile, the present invention further provides a method for separating and recovering intestinal contents, and an extract of intestinal contents obtained by separation and recovery.

It is emphasized hereby that, unless otherwise specified, the terms as used herein have the same meanings with the common meanings of various scientific and technological terms in the art, and the meanings of professional terms defined in various technical dictionaries, textbooks, etc.

The present invention first provides a device for separating and recovering intestinal contents including an impurity removal module and a target content collecting module; wherein the impurity removal module is configured to remove the impurity component(s) of the intestinal contents, and has a cross-flow filtering structure; the target content collecting module is mainly composed of a microporous membrane cross-flow filter, wherein the microporous membrane has a spongy porous structure, the pore size range of the microporous membrane is 0.01 to 20 μm, preferably, the pore size range of the microporous membrane is 0.1 to 10 μm, preferably, the pore size range of the microporous membrane is 0.2 to 5 μm, and the porosity of the microporous membrane is 30% or more, preferably 50%, 60% or more, preferably, 70%, 80%, 85% and 90% or more, and the microporous membrane is a hydrophilic film.

Further, the microporous membrane cross-flow filter has a disc structure, and the ratio of the effective filtration area of the cross-flow disc to the overall area of the cross-flow disc is 0.3-0.9; preferably, the ratio is 0.4-0.8, preferably, the ratio is 0.5-0.6. The ratio thereof represents the effective utilization of the microporous membrane in the cross-flow filtration. Optionally in the present invention, the overall area of the microporous membrane cross-flow disc is about 270 $cm^2$, and the effective filtration area is about 150 $cm^2$.

Further, the flow channel of the microporous membrane cross-flow filter is a spiral flow channel. The spiral flow channel can provide an effective support to the liquid flow, and allows the microporous membrane to be used in the cross-flow filtration as much as possible.

Further, the cross-sectional area of the flow channel of the microporous membrane cross-flow filter is less than the cross-sectional area of the inlet pipe, and the ratio of the former to the latter is 0.8, 0.6, or 0.5, or less. For example, the cross-sectional area of the inlet pipe is about 35 $mm^2$, and the cross-sectional area of the flow channel of the microporous membrane cross-flow filter is about 15-20 $mm^2$. In the present invention, the cross-flow filtration can be realized without specially using a pressurized or a negative pressure device, but it does not mean that the corresponding device cannot be used, which will increase the additional cost.

Further, the separation and recovery device includes a pump for delivering a solution of the intestinal contents from the impurity removal module through a pipe to the target content collection module. Preferably, the pump is a peristaltic pump, so as to avoid cross infection to the solution of intestinal contents and satisfy the requirements of medical consumables.

Further, the impurity removal module includes multi-stage filtration, such as, coarse filtration and fine filtration modules. Preferably, the fine filtration module utilizes cross-flow filtration.

Further, the concentrate from the cross-flow filtration is mixed with the penetrating fluid of the last stage filtration to form a recycling loop.

Further, the materials of the microporous membrane include one or more of polyether sulfone membrane, cellulose membrane, and polymethacrylate membrane which are modified or unmodified. Preferably, the microporous polyether sulfone membrane is a wet casting phase inversion membrane. The polyether sulfone membrane is optionally an improved polyether sulfone filter membrane, such as, disc filter membrane 003 (0.03 μm), 010 (0.1 μm), 020 (0.2 μm), 045 (0.45 μm), 065 (0.65 μm), 080 (0.80 μm), 120 (1.2 μm), 500 (5.0 μm), 1000 (10 μm). The microporous membrane of the present invention has a network structure formed by particles connected via ribbon fibers in which the uneven pore structure presents a steric or three-dimensional change of pores, and a spongy porous structure with high porosity. Such membrane structure exhibits excellent performance in cross-flow filtration relative to a uniform nuclear pore membrane, and does not need to specially use a pressurized or negative pressure device to achieve rapid and efficient cross-flow filtration. Meanwhile, in order to avoid the rupture of the microporous membrane in use, a gasket can be incorporated onto the back of the membrane.

Further, a device for separating and recovering intestinal contents is provided according to an embodiment of the present invention, wherein the device for separating and recovering intestinal contents includes an impurity removal module and a target content collection module, the impurity removal module includes a stirring coarse filtration module and a fine filtration module;

the stirring coarse filtration module is a vessel having a stirring device provided at the upper part of the vessel, a coarse filter mesh arranged at the lower part of the vessel, and a liquid outlet and a reflux port arranged at the bottom of the vessel;

the fine filtration module includes a fine filtration cross-flow disc filter;

after mixing the intestinal contents (feces) with a solvent (e.g., normal saline), the mixture is first thoroughly stirred by the stirring device so as to fully disperse the intestinal contents within the solvent, and then filtered by the coarse filter mesh to remove the large-sized impurities and delivered by a first delivery pump to the fine filtration cross-flow disc filter, wherein the small-sized impurities are removed by the fine filtration cross-flow disc filter.

The target content collection module includes a microporous membrane cross-flow disc filter utilizing a microporous filter mesh. The penetrating fluid filtered by the fine filtration module is delivered by a second delivery pump to the microporous membrane cross-flow disc filter, after cross-flow filtration by the microporous membrane filter mesh, the target contents are collected from the concentrate of the microporous membrane cross-flow disc filter.

Further, the fine filtration cross-flow disc filter has a filter mesh size of 5-100 μm, preferably 5-50 μm, preferably 10 μm, 20 μm, 25 μm or 30 μm.

Further, the microporous membrane cross-flow disc filter has a filter mesh (microporous membrane) size of 0.01-20 μm, preferably 0.1-10 μm, preferably 0.2 μm, 0.5 μm, 1 μm, 2 μm, 5 μm or 7 μm.

Further, the fine filtration module further includes a liquid storage box, the penetrating fluid filtered by the fine filtration cross-flow disc filter is passed into the liquid storage box, and then into the target content collection module. The finely filtered concentrate is refluxed to the vessel through the pipe via the reflux port, mixed with the coarsely filtered penetrating fluid to form a recycling loop.

Further, the target content collection module further includes a iste penetrating fluid box, the penetrating fluid filtered by the microporous membrane cross-flow disc filter is passed into the iste penetrating fluid box, and the concentrate is refluxed through the pipe to the liquid storage box of the fine filtration module. After a recycling filtration for 10-60 minutes, preferably 50 minutes, the target contents are collected from the concentrate of the microporous membrane cross-flow disc filter.

Further, the target content collection module includes a microporous membrane cross-flow disc filter; alternatively, the target content collection module includes a plurality of microporous membrane cross-flow disc filters with different pore sizes which are arranged in sequence according to the pore size from large to small, so as to collect the target contents with different sizes.

Further, the target contents are intestinal microorganisms (intestinal flora) including *Bifidobacterium, Lactobacillus, Escherichia coli, Enterococcus*, etc., which have a size between 0.1 μm and 50 μm.

Further, a housing is arranged outside the vessel of the stirring coarse filtration module, an exhaust port is arranged on the top of the housing, and malodorous gases generated by the feces is discharged via the exhaust port and passed through a deodorization device for odor removal.

Further, the separation and recovery device are provided with an oxygen removal module for ensuring and keeping that the intestinal contents are maintained under low oxygen or oxygen-free atmosphere during the separation and recovery process.

The present invention also provides a method for separating and recovering intestinal contents by using the device of the present invention, including:

Step 1) Dispersion: Mixing the intestinal contents with a liquid dispersion medium at a ratio of 100 g: 200-5000 ml, preferably 100 g: 300-1000 ml, or 100 g: 500-800 ml, and dispersing the resultant mixture in a mechanical manner to form a dispersion mixture.

Step 2) Impurity removal: Filtering the dispersion mixture by the filter mesh structure for impurity removal by filtration, the filtration including cross-flow filtration to give a penetrating fluid (filtered liquor).

Step 3) Collection: Filtering the penetrating fluid in Step 2) by a microporous membrane cross-flow filter to give a concentrate and a filter waste, wherein the concentrate is used to collect the target contents.

The microporous membrane of the microporous membrane cross-flow filter has a spongy porous structure, the pore size of the microporous membrane is in the range of 0.01-20 μm, preferably, the pore size of the microporous membrane is in the range of 0.1-10 μm, preferably, the pore size of the microporous membrane is in the range of 0.2-5 nm; and the porosity of the microporous membrane is 30% or more, preferably 50%, 60% or more, preferably, 70%, 80%, 85%, 90% or more. The microporous membrane is a hydrophilic film.

Further, the amount of bacteria in the dispersion mixture in Step 1) includes at least $10^8$/ml, or $10^9$/ml, or $10^{10}$/ml.

Further, the concentrate in Step 3) is refluxed and mixed with the penetrating fluid in Step 2) to form a recycling loop.

Further, the impurity removal by filtration in Step 2) is divided into coarse filtration and fine filtration, wherein the coarse filtration utilizes a filter mesh with a pore size of more than 10 μm, or 50 μm, or 100 μm, or 200 nm, or 500 μm to obtain a coarse penetrating fluid (filter liquor), which is subsequently subject to fine filtration.

Further, the fine filtration in Step 2) is cross-flow filtration, wherein the fine filtration utilizes a filter mesh with a pore size of 5-100 μm, preferably 5-50 μm, preferably 10 μm, 20 μm, 25 μm or 30 μm to obtain a finely penetrating fluid (filtrate) and a concentrate, wherein the finely penetrating fluid is passed into the microporous membrane cross-flow filter in Step 3) for filtration to obtain a concentrate and a filter waste.

Further, the concentrate in step 3) is returned to the prior stage and mixed with the penetrating fluid to form a recycling loop.

Further, the mechanical manner in Step 1) is stirring or other manners that can effectively disperse a similar solid-liquid mixture, such as, ball milling, vibration, etc.

Further, the concentrated solution in step 3) is prepared into dry powder by lyophilization.

A composition including extracts of intestinal contents is prepared by using any one of the device for separating and recovering intestinal contents as described above or in accordance with any one of the method for separating and recovering the intestinal contents as described, wherein the resultant extracts of intestinal contents have a size of 0.01-50 µm, or 0.1-40 µm, or 0.2-30 µm, or 0.5-20 µm.

Further, the extracts of intestinal contents are concentrated solution and are formed into dry powder prepared by lyophilizing the amount of bacteria which includes at least $10^{11}/1$ g dry powder, or $2\times10^{11}/1$ g dry powder, or $5\times10^{11}/1$ g dry powder, or $10^{12}/1$ g dry powder.

The flora distribution (types and abundance) of the extracts of the intestinal contents is very close to that in the intestinal contents.

With respect to the particular substances to be processed of the intestinal contents, currently the centrifugal separation is often used in the extraction of flora due to the characteristics of high viscosity and large individual difference of the intestinal contents and process difference of the operators. However, centrifugal separation causes a large number of bacteria to be separated and discarded, and has disadvantages of poor quality control; loss of a lots of bacteria, low biodiversity; poor repeatability; inconvenient operation; poor environmental control, low bacteria survival rate (there are a large number of anaerobic bacteria in the intestine), thereby resulting in poor or unstable therapeutic effect.

The bacteria species contained in the intestinal contents have different reproduction rates. If the intestinal contents cannot be separated and extracted in an effective time period of, e.g., 1.5 h, preferably 1 h, the distribution of the bacteria species in the resultant extract will differ from that of the original intestinal contents.

The device for separating and recovering the intestinal contents of the present invention does not use any centrifugal components. It does not need to obtain the target contents by centrifugation, while utilizes a combination of cross-flow filtration and microporous membrane to obtain the target contents, thereby ensuring the filtration efficiency, and completing the extraction within the effective time period. It solves the problems of blocking and low efficiency problems, can effectively extract all the bacteria species, and retains the relative abundance of the original bacteria species.

The present invention adopts the microporous membrane cross-flow filtration to enrich the target intestinal contents, instead of the traditional centrifugal separation technology. Firstly, the extraction process can be more accurate and controllable, and has high separation efficiency, simple and convenient operation and high degree of automation degree. In addition, by using microporous membranes with different pore sizes, the desired intestinal contents can be selectively separated by a size effect.

The present invention divides the filtration into coarse filtration and fine filtration, wherein the fine filtration is carried out by cross-flow filtration. Traditionally, the fine filtration is performed by means of filter mesh. The fine filter mesh is very easy to be blocked by impurities due to the mesh size is in the range of 0.01-1 mm, thereby greatly reducing the filtration efficiencies. Moreover, a variety of viscous components contained in the feces also lead to a reduction of the efficiency of the traditional filter mesh filtration. As a result, a large number of target microorganisms cannot successfully pass through the fine filter due to the blocking of the fine filter mesh, resulting in a remarkable reduction of the finally collected target microorganisms. By cross-flow filtration, the small-sized impurities are removed from the feces samples, and the intercepted materials on the membrane surface are continuously washed by a tangential force parallel to the membrane surface generated by water flow, so as to prevent the blockage of small holes, improve the separation efficiency, greatly increase the probability of microorganisms passing through the filter mesh, and prolong the service life of the filter mesh.

Traditionally, a filter mesh with a pore size of less than 20 µm is difficult to use in filtration because the fine filtration module is prone to block. As a result, a high proportion of small-sized impurities will be found in the filtrate. However, the fine filtration module of the present invention adopts the cross-flow filtration, and thus the cross-flow filter with a mesh size of 15 µm or even smaller can be selected and used in the fine filtration module, which can greatly reduce the content of impurities with a smaller size passing through the cross-flow filter, thereby increasing the purity of the target content collected by the target content collection module.

In the present invention, following the fine filtration step, the microporous membrane cross-flow filtration is used to enrich the target intestinal contents, wherein the fine filtration module synergistically cooperates with the target content collection module: the target contents with different sizes are enriched by designing of filter pore sizes of the fine filtration module and the target content collection module. For example, the fine filtration module using a cross-flow filter with a pore size of 5 µm and the target content collection module using a cross-flow filter with a pore size of 1 µm can be used to selectively collect the target contents with a size of 1-5 µm.

In the present invention, both the cross-flow filtration in the fine filtration module and the target content collection module are preferably carried out by a cross-flow disc filter, which executes cross-flow filtration by spirally arranged pipes disposed inside the micro cross-flow disc filter, and can significantly increase the effective filtration area, thereby reducing volume of the filter.

The method for separating and recovering the intestinal contents of the present invention has a higher extraction rate and a higher extraction efficiency. Relative to the original wet intestinal contents, the percentage of separated and recovered dry powder of bacteria is at least 10%-20%, and the amount of bacteria is at least $10^{11}/1$ g dry bacteria powder. That is, at least 10-20 g of dry bacteria powder can be obtained from 100 g of initial wet feces. The extraction efficiency of number of the bacteria of the present invention is at least $6.7\times10^9/(cm^2\cdot h)$ to $1.34\times10^{10}/(cm^2\cdot h)$. Namely, 100 g of initial wet feces can be completely separated and recovered in an effective filtration area of about 150 cm² and within at most 60 min, so as to obtain at least 10-20 g of flora dry powder with the amount of the bacteria of $1\times10^{12}$ to $2\times10^{12}$.

BRIEF DESCRIPTION OF THE DRAWINGS

The drawings described herein are used to provide a further understanding of the embodiments of the present invention, and constitute a part of the present invention. The illustrative embodiments of the invention and the description thereof are used for the purpose of interpreting the present invention, and do not constitute an improper limitation of the invention. In the drawings.

DESCRIPTION OF REFERENCE SIGNS

Figure 2:
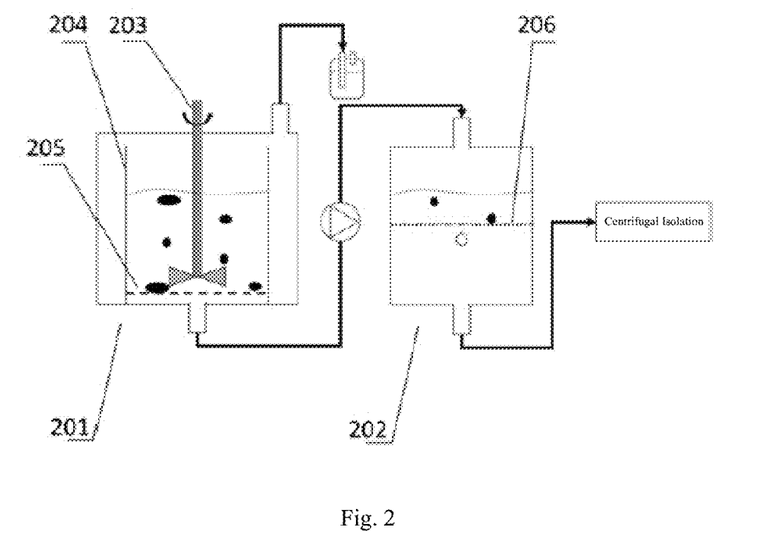
FIG. 2 is a schematic view of the system for separating and recovering the intestinal contents using a traditional centrifugal separation in a Comparative Example 1.
Figure 6:
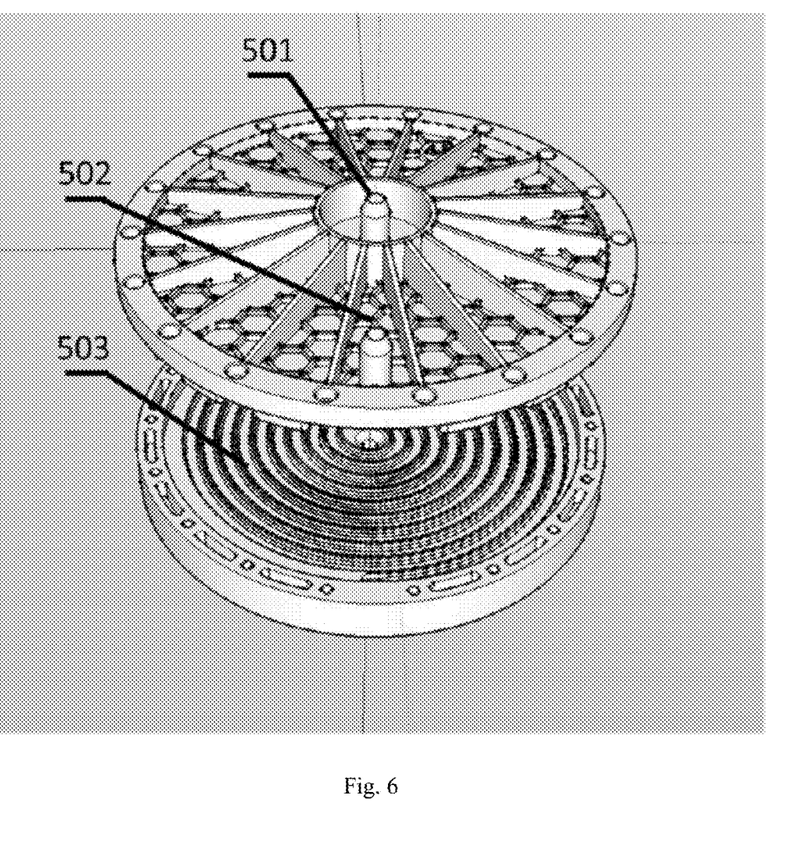
FIG. 6 is a schematic view of the cross-flow disc filter of Embodiment 1.

1: Impurity removal module; 2: target content collection module; 3: stirring coarse filtration module; 4: fine filtration module; 5: stirring device; 6: vessel; 7: coarse filter mesh; 8: liquid outlet; 9: reflux port; 10: fine filtration cross-flow disc filter; 11: first delivery pump; 12: microporous membrane cross-flow disc filter; 13: second delivery pump; 14: liquid storage box; 15: iste liquid box; 16: housing; 17: exhaust port; 18: deodorization device;

201: stirring coarse filtration module; 202: fine filtration module; 203: stirring device; 204: vessel; 205: coarse filter mesh; 206: fine filter mesh;

501: cross-flow liquid inlet; 502: concentrate liquid outlet; 503: spirally arranged cross-flow filtration pipe.

DETAILED DESCRIPTION OF THE EMBODIMENTS

Hereinafter the technical solutions of the present invention will be clearly and completely described by reference to the specific embodiments of the present invention and the corresponding accompanying drawings to make the objects, technical solutions and advantages of the present invention clearer. Obviously, the described embodiments are only a part, rather than all, of the embodiments of the present invention. Based on the embodiments of the present invention, any other embodiments obtained by ordinary technicians in the art without any creative work fall within the protection scope of the present invention.

In the present invention, the test for the flora of intestinal contents is mainly conducted by 16rRNA gene amplicon sequencing.

Hereinafter by reference to the accompanying drawings, the technical solutions provided according to the examples of the present invention are described in detail.

Example 1

Figure 1:
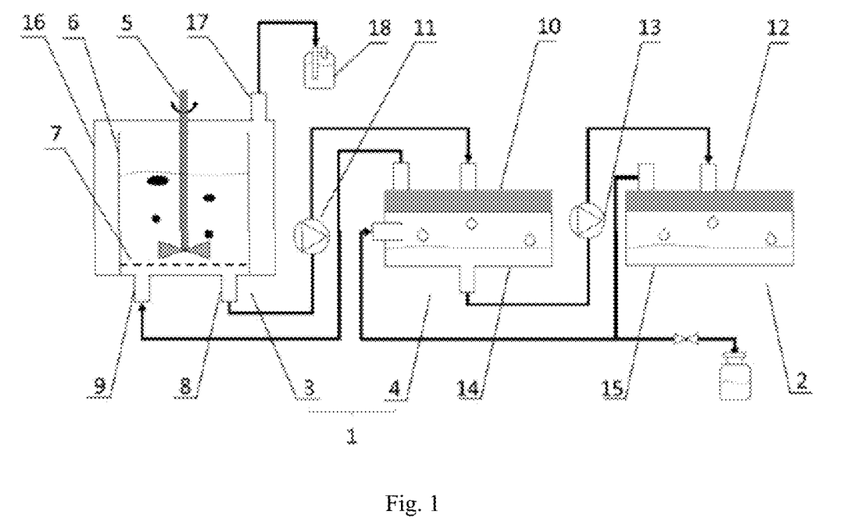
FIG. 1 is the system for separating and recovering the intestinal contents of Embodiment 1.

FIG. 1 shows a device of separating and recovering the intestinal contents according to an embodiment of the present invention, wherein the device of separating and recovering the intestinal contents includes: an impurity removal module 1 and a target content collection module 2, wherein, the impurity removal module 1 includes a stirring coarse filtration module 3 and a fine filtration module 4.

The stirring coarse filtration module 3 includes a vessel 6 internally provided with a stirring device 5. The stirring device 5 is arranged at the upper part of the vessel 6, and a coarse filter mesh 7 is arranged at the lower part of the vessel 6. The stirring device 5 is located above the coarse filter mesh 7. A liquid outlet 8 and a reflux port 9 are arranged at the bottom of the vessel 6, and are separated from each other.

In operation, e.g., 130 g of initial wet intestinal contents (feces) are mixed with 750 ml of normal saline in the vessel 6, and then fully stirred and dispersed by the stirring device 5. The dispersion is filtered by the coarse filter mesh 7, and discharged via the liquid outlet 8, so that larger impurities are removed from the feces.

The fine filtration module 4 includes a fine filtration cross-flow disc filter 10, wherein the liquid filtered by coarse filtration is delivered by a first delivery pump 11 to the fine filtration cross-flow disc filter 10 after being discharged through the liquid outlet 8, so that the smaller-sized impurities are removed by the fine filtration cross-flow disc filter 10. The fine filtration module 4 further includes a liquid storage box 14 in fluid communication with the fine filtration cross-flow disc filter 10, and the penetrating fluid filtered by the fine filtration cross-flow disc filter 10 is passed into the liquid storage box 14. The concentrate can be refluxed via a pipe through the reflux port 9 to the bottom of the vessel 6, and mixed with the penetrating fluid under coarse filtration. The fine filtration cross-flow disc filter 10 has a filter pore size of 10 μm.

The target content collection module 2 includes a microporous membrane cross-flow disc filter 12 with a microporous membrane filter mesh, and the penetrating fluid filtered by the fine filtration module 4 can be delivered by a second delivery pump 13 into the microporous membrane cross-flow disc filter 12. After being filtered by the microporous membrane filter mesh, the target contents are collected from the concentrates of the microporous membrane cross-flow disc filter 12.

The microporous membrane cross-flow disc filter 12 has a pore size of 0.1 μm. The microporous membrane is a hydrophilic polyether sulfone membrane with a porosity of 85%. The effective filtration area of the cross-flow disc is 155 cm$^2$, and the ratio of the effective filtration area to the overall area of the cross-flow disc is 0.5. The cross-sectional area of the inlet pipe is about 35 mm², and the cross-sectional area of the flow channel of the cross-flow disc is about 15 mm².

The penetrating fluid filtered by the microporous membrane cross-flow disc filter 12 is passed into the iste liquid box 15, and the concentrate is refluxed via a pipe to the liquid storage box 14 of the fine filtration module. In operation, after recycling filtration for, e.g., 5 minutes, the target contents are collected from the concentrate of the microporous membrane cross-flow disc filter 12. All the samples can be filtered and collected over about 60 minutes. The samples are freeze-dried to obtain 15 g of dry powder with the amount of $10^{11}/1$ g dry powder.

Figure 3:
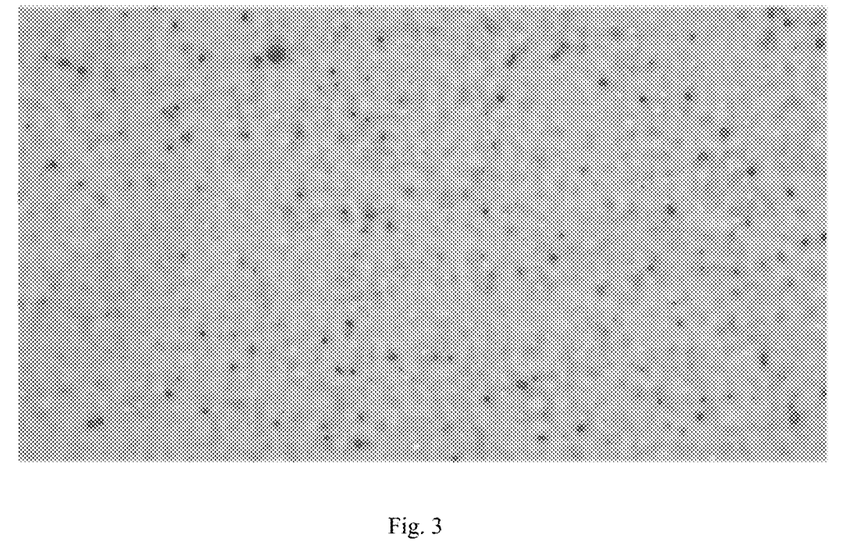
FIG. 3 is a photo under 200× micrograph of a product collected from the concentrated solution obtained by the microporous membrane cross-flow disc filter (12) separated by the device for separating and recovering the intestinal contents in Embodiment 1.

The collected concentrate of the microporous membrane cross-flow disc filter 12 is observed under 200× microscope, as shown in FIG. 3.

Figure 7:
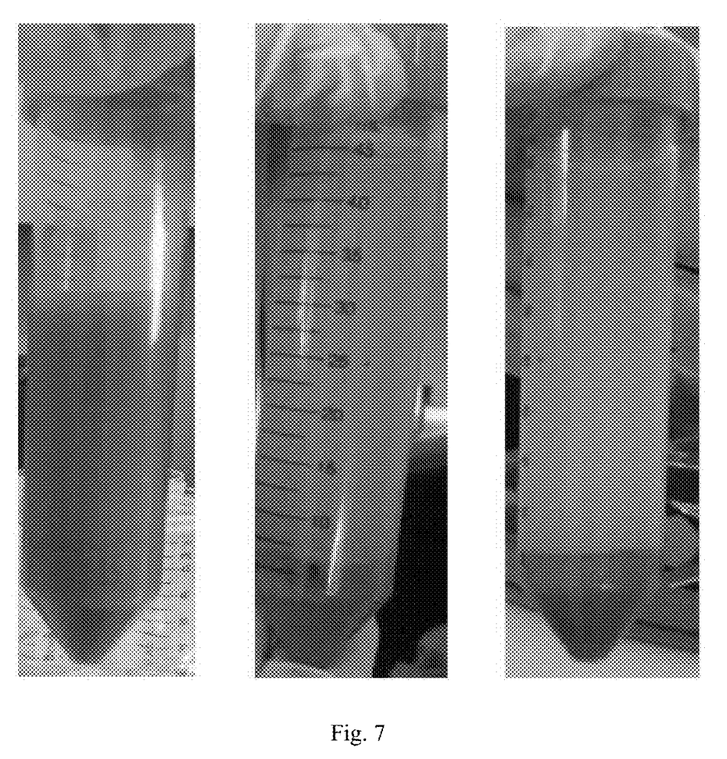
FIG. 7 shows sample photos under centrifugation in the Comparative Example 1 (Left Fig. a: the sample photo under the first centrifugation; Middle Fig. b: the sample photo under the second centrifugation; Right Fig. c: the sample photo under the third centrifugation).

The microporous membrane cross-flow disc filter 12 has a spiral structure as shown in FIG. 7. The design of the spiral structure is relatively compact, and can help to reduce the volume of the whole device, and also has a good filtering effect.

A housing 16 can be arranged outside the vessel 6 of the stirring coarse filtration module 3. An exhaust port 17 can be disposed on the top of the housing 16. Malodorous gases generated by the feces are discharged via the exhaust port 17, and passed through a deodorization device 18 for odor removal.

Comparative Example 1

A device for separating and recovering the intestinal contents includes only an impurity removal module as compared with the one in Embodiment 1, as shown in FIG. 2. The impurity removal module includes a stirring coarse filtration module 201 and a fine filtration module 202. The stirring coarse filtration module 201 is the same as the stirring coarse filtration module 3 in Embodiment 1, that is, a vessel 204 having a stirring device 203 arranged at the upper part thereof and a coarse filter mesh 205 arranged at the bottom thereof. The faces are mixed with water in the vessel 204, fully dispersed by the stirring device 203, filtered by the coarse filter mesh 205 to remove the larger-sized particles of impurities from the feces. The fine filtration module 202 includes a fine filter mesh 206, and conventional filtration (other than cross-flow filtration) is used to remove the impurities of smaller-sized particles. Due to the small pore size of the fine filter mesh, the filtration speed of the filtrate is very slow during the filtration process, and only a small number of samples can block the fine filter mesh, which needs to be replaced or cleaned frequently. Otherwise, the filtrate is difficult to penetrate therethrough.

Figure 8:
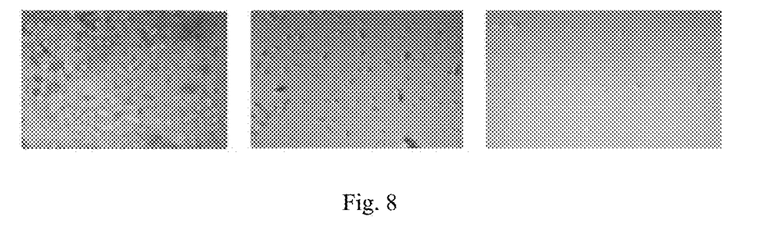
FIG. 8 shows an electron micrograph of supernatants of the Comparative Example 1 (Left Fig. a: the supernatant under the first centrifugation; Middle Fig. b: the supernatant under the second centrifugation; Right Fig. c: the supernatant under the third centrifugation).
Figure 9:
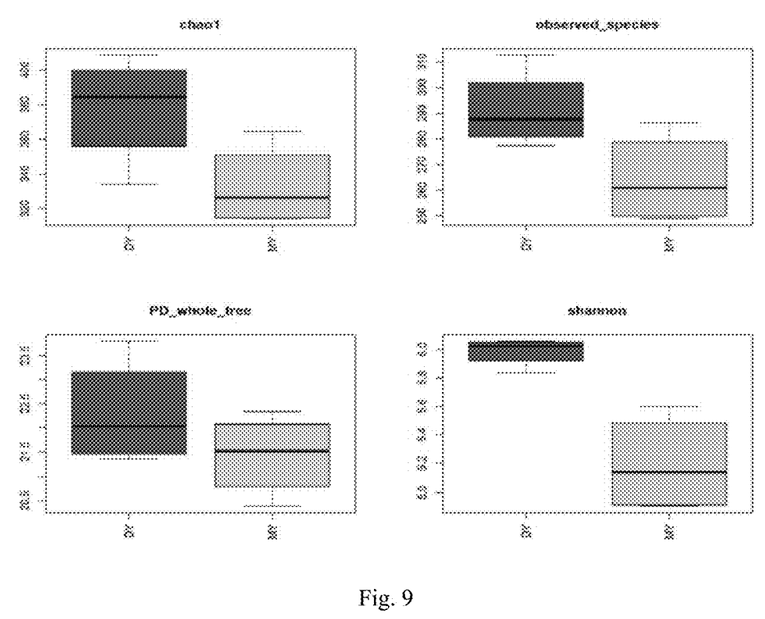
FIG. 9 is a comparison diagram of Alpha diversity of the separated and recovered target contents in Embodiment 6 and the Comparative Example 3.

The fecal suspension after impurity removal by the fine filter mesh 206 is subject to centrifugation at 1500 rpm for 3 minutes so as to separate intestinal microorganisms. The above operation is repeated for three times, and the sample photos under each centrifugation are shown in FIG. 8. Each supernatant after centrifugation is analyzed by an electron microscope, as shown in FIG. 9. It can be seen from FIGS. 8 and 9 that the supernatant obtained by centrifugation of the resultant samples comprise a large number of bacteria species. The loss of these bacteria species leads to the reduction of the effective amount of the final extract of the intestinal contents, and the distribution of bacteria species is different from that in the original intestinal contents.

Figure 4:
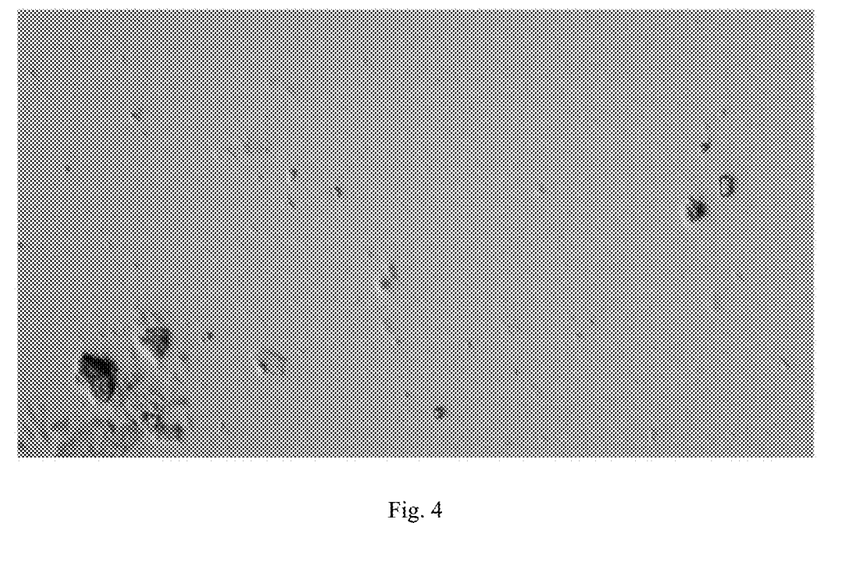
FIG. 4 shows a photo under 200× micrograph of 2 g solid precipitate from the lower precipitate obtained by traditional centrifugal separation in the Comparative Embodiment 1, wherein the solid precipitate is dissolved in 25 ml of normal saline.

The final precipitate after three centrifugation is about 6 g in total. 2 g of solid precipitate is dissolved into 25 ml of normal saline, and the photos under 200× microscope are shown in FIG. 4. It can be seen from FIG. 4 that, the content of microorganisms in the collected precipitate in the lower layer is very low. Therefore, the effect of collecting microorganisms by centrifugation is poor, and the therapeutic effect is poor due to the low content of microorganisms in the product.

As can be seen by comparing Embodiment 1 with Comparative Example 1, the fine filtration is performed in a manner of cross-flow filtration to remove the small-sized impurities from the fecal sample, the intercepted materials on the membrane surface are continuously washed by a tangential force parallel to the membrane surface generated by water flow, so as to prevent the blockage of small holes, improve the separation efficiency, and prolong the service life of the filter mesh. After the fine filtration step, the target intestinal contents are enriched by microporous membrane cross-flow filtration, instead of traditional centrifuged separation technology, whereby making the extraction process to be more accurate and controllable, has a high separation efficiency at first and meanwhile having, a simple and convenient operation, and a high degree of automation.

Comparative Example 2

A device for separating and recovering the intestinal contents includes an impurity removal module and a target content collection module. The impurity removal module includes a stirring coarse filtration module and a fine filtration module. The stirring coarse filtration module is a vessel having a stirring device arranged at the upper part, and a coarse filter mesh at the lower part. A liquid outlet and a reflux port are disposed at the bottom of the vessel. 130 g of feces are mixed with 750 ml of normal saline in the vessel, and fully dispersed by the stirring device, and filtered by the coarse filter mesh to remove the larger-sized particles of impurities from the feces.

The fine filtration module includes two layers of fine filter meshes with different pore sizes. The pore sizes of the fine filters are 0.5 mm and 10 μm from top to bottom, respectively. The liquid filtered by the coarse filtration is delivered into the fine filter mesh where the smaller-sized impurities are removed. The fine filtration module further includes a liquid storage box, and the penetrating fluid filtered by the fine filter mesh is entered into the liquid storage box.

Figure 5:
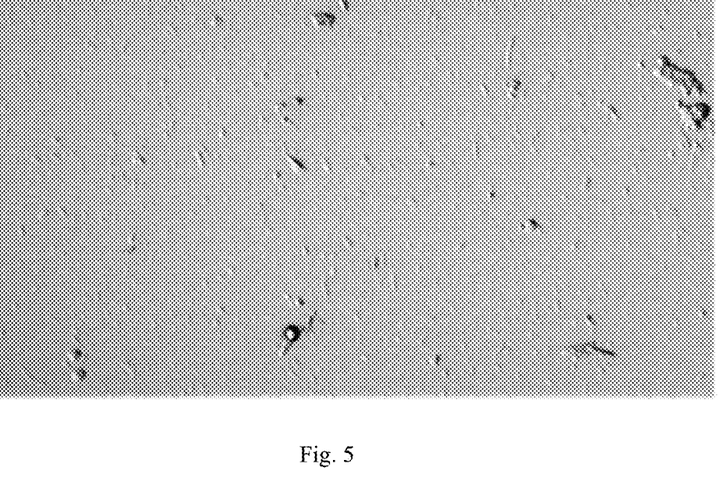
FIG. 5 is a photo under 200× micrograph of the product collected from the concentrated solution obtained by the microporous membrane cross-flow disc filter separated by the device for separating and recovering the intestinal contents in the Comparative Example 2.

The target content collection module is the same as that of Embodiment 1. However, the filtration efficiency is very low because a conventional multi-stage filtration is used in the fine filtration module. All samples need to be filtered and collected in about 150 minutes, which is substantially longer than times in Embodiment 1. The resultant target products are about 7 g. The collected concentrate from the microporous membrane cross-flow disc filter is observed under 200× microscope, as shown in FIG. 5. Although the amount of collected microorganisms is increased compared with that in Comparative Example 1, it is still substantially less than that in Embodiment 1. Moreover, it can be noted that the impurity content of Comparative Example 2 is clearly much higher than Embodiment 1.

It can be seen that by comparing Embodiment 1 with Comparative Example 2, both the fine filtration module and the target collection module utilizes the cross-flow filtration, the intercepted materials on the membrane surface are continuously ished by a tangential force parallel to the membrane surface generated by water flow, so as to prevent the blockage of small holes. Moreover, the continuous washing of the intercepted materials on the surface also helps to separate the microorganisms from the intercepted impurities, whereby improving the filtration efficiency, and significantly increasing the probability of microorganisms passing through the filter mesh. The entire recovery and extraction process of Comparative Example 2 is time-consuming, the filter mesh is prone to block during the filtration process; and the amount of the resultant target products is also small.

Embodiments 2-5

According to another Embodiment 2 of the present invention, a device for separating and recovering the intestinal contents is provided, which has the same overall structure as that of Embodiment 1, wherein the fine filtration cross-flow disc filter 10 has a filter pore size of 5 μm and the microporous membrane cross-flow disc filter 12 has a filter pore size of 1 μm. The comparison of particle size distribution of the concentrates separated in Embodiment 1 and Embodiment 2 is shown in FIG. 6. It can be seen that the target contents with different sizes can be enriched by the design of the filter pore sizes of the fine filtration module and the target content collection module, so that the target contents in the concentrate of Embodiment 2 have a narrower particle size distribution.

According to another Embodiment 3 of the present invention, a device for separating and recovering the intestinal contents is provided, which has the same overall structure as that of Example 1, wherein the fine filtration cross-flow disc filter 10 has a filter pore size of 100 μm and the microporous membrane cross-flow disc filter 12 has a filter pore size of 0.05 μm.

According to another Embodiment 4 of the present invention, a device for separating and recovering the intestinal contents is provided, which has the same overall structure as that of Embodiment 1, wherein the fine filtration cross-flow disc filter 10 has a filter pore size of 50 μm and the microporous membrane cross-flow disc filter 12 has a filter pore size of 20 μm.

According to another Embodiment 5 of the present invention, a device for separating and recovering the intestinal contents is provided, which has the same overall structure as that of Embodiment 1, wherein the fine filtration cross-flow disc filter 10 has a filter pore size of 5 μm and the microporous membrane cross-flow disc filter 12 has a filter pore size of 0.05 μm.

Embodiment 6 and Comparative Example 3

A same intestinal contents (feces) is equally divided into three parts based on weight, which are designated as DY, MY and F, wherein DY is used in Embodiment 6, MY is used in Embodiment 3, and F is the original feces.

The intestinal contents of Embodiment 6 are separated and recovered by the same separation and recovery device of Embodiment 1, including:

Step 1) Dispersion: Mixing the intestinal contents with a liquid dispersing medium (normal saline) at a ratio of 100 g:500 ml; dispersing the resultant mixture in a mechanical manner; and fully stirring the mixture by the stirring device 5 to form a dispersion mixture;

Step 2) Impurity removal: Filtering the dispersion mixture by a filter mesh structure for impurity removal by filtration, wherein the filtration includes coarse filtration and cross-flow fine filtration, the dispersion mixture in the vessel 6 is filtered by the coarse filter mesh 7, and discharged via the liquid outlet 8, so that the larger-sized particles of impurities are removed from the feces;

The penetrating fluid of the coarse filtration is entered into the fine filtration cross-flow disc filter 10 with a filter pore size of 50 μm to remove the smaller-sized impurities;

Wherein, a sufficient amount of penetrating fluid can be obtained after being stirred by the stirring device 5 for 5 minutes, and started to the fine filtration operation. After being finely filtered for 10 minutes, a sufficient penetrating fluid (filtrate) can be obtained and start to the step of collecting the target contents.

Step 3) Collection: Filtering the penetrating fluid in Step 2) by a microporous membrane cross-flow filter to obtain a concentrate and a waste filtrate, wherein the concentrate is used to collect the target contents.

The microporous membrane of the microporous membrane cross-flow filter has a non-uniform pore structure with a pore size of 0.2 μm and a porosity of 80%. The microporous membrane is a hydrophilic film, the effective filtration area of the cross-flow disc is 155 $cm^2$; the cross-sectional area of the inlet pipe is about 35 $mm^2$, and the cross-sectional area of the flow channel of the cross-flow disc is about 15 $mm^2$.

Step 4) Lyophilization: Lyophilizing the target contents obtained in Step 3) to form 12 g of dry powder whose bacteria amount is $1.5 \times 10^{11}/1$ g dry powder, and is made into capsules;

Wherein, the concentrate obtained by the fine filtration in the impurity removal step is returned to mix with the penetrating fluid of the coarse filtration to form a recycling loop; and the concentrate of the microporous membrane cross-flow filter is returned to mix with the penetrating fluid of the fine filtration of the impurity removal step to form a recycling loop.

The process from Step 1) to Step 3), that is, the entire separation process, takes 60 min.

Comparative Example 3

By use of the device for separating and recovering the intestinal contents as shown in FIG. 2, 100 g of intestinal contents are mixed with 550 ml of normal saline, and stirred by a stirrer for 5 min, and filtered by the coarse filter mesh and the fine filter mesh with a pore size of 0.25 mm. The penetrating fluid obtained by the fine filtration is subject to centrifugation at 2000 rpm for 5 min. After centrifugation, the supernatant is discarded, and normal saline is added. The centrifugation is repeated for three times, then the supernatant is discarded to obtain the residual precipitate, that is, the target contents.

Embodiment 6 (DY) and Comparative Example 3 (MY) are repeated for four times (feces from the same donor are obtained for four times within a week for experiments), and the resultant target contents and the original feces (F) use the 16sR DNA sequencing method to determine types and abundance of the bacteria.

The microbial diversity is studied in community ecology. The abundance and diversity of microbial community can be reflected by the diversity analysis (Alpha diversity) of a single sample, including a series of statistical analysis indexes to estimate the species abundance and diversity of environmental community. Shannon: one of the indices used to estimate microbial diversity in samples. The higher the Shannon value is, the higher the community diversity is.

FIG. 9 indicates that the flora extracted in accordance with the present invention have better species diversity compared with those obtained by centrifugation, and present a remarkable difference therefrom.

Principal component analysis (PCA) uses a variance decomposition to reflect the differences of multiple groups of data on the two-dimensional coordinate graph. The coordinate axis takes the two eigenvalues that can reflect the maximum variance value. For example, the more similar the sample composition is, the closer the distance reflected in the PCA graph is.

Figure 10:
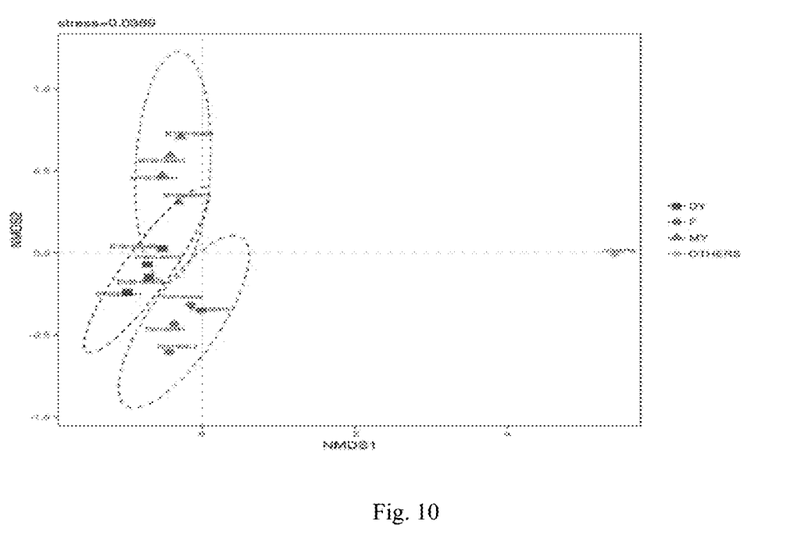
FIG. 10 is a comparison diagram of Beta diversity of the separated and recovered target contents and the original feces in Embodiment 6 and the Comparative Example 3.
Figure 11:
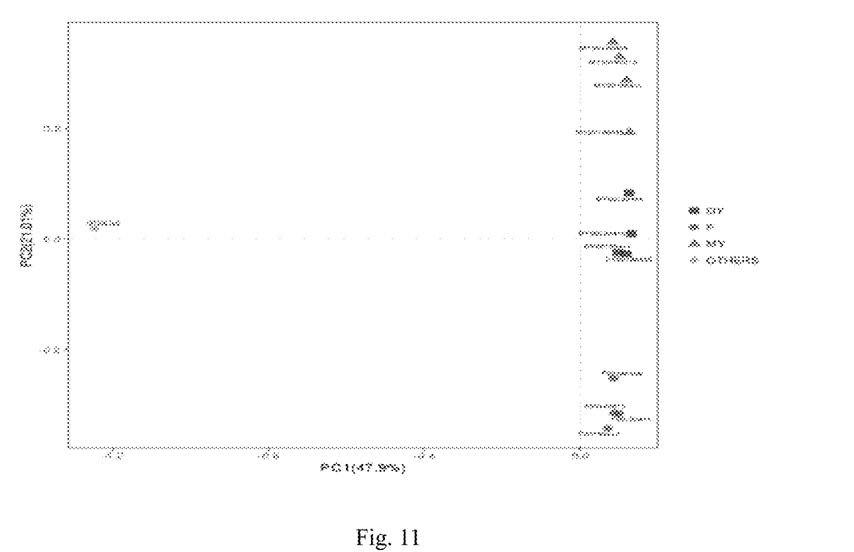
FIG. 11 is a comparison diagram of Beta diversity of the separated and recovered target contents and the original feces in Embodiment 6 and the Comparative Example 3.
Figure 12:
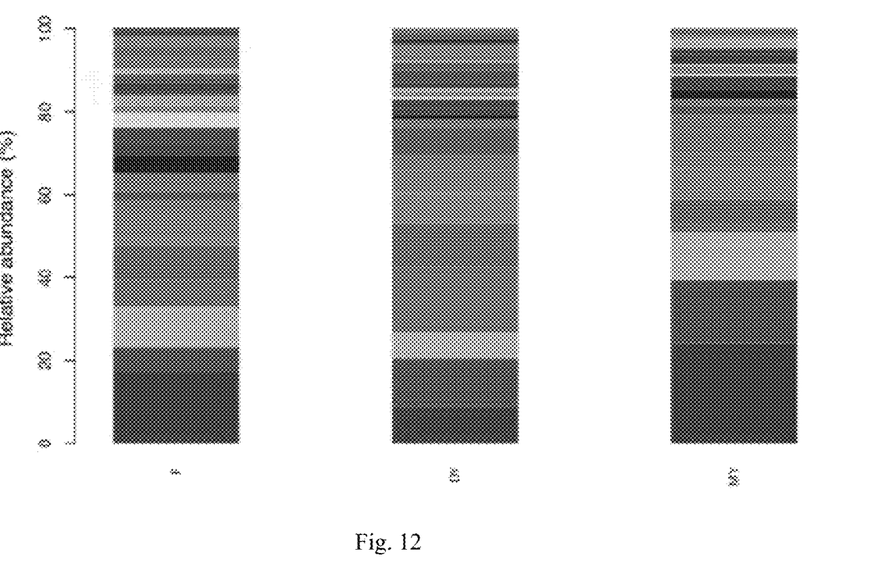
FIG. 12 is a comparison diagram of bacteria diversity of the separated and recovered target contents and the original feces in Embodiment 6 and the Comparative Example 3.

FIGS. 10-12 indicate that the flora extracted in accordance with the present invention is more similar with the original feces in terms of species and abundance, and has higher similarity and a statistically significant difference.

The target contents obtained by Embodiment 6 (DY) and Comparative Example 3 (MY) present statistically significant difference as compared with the original feces (F).

The R-value is between (−1,1), and the R-value is greater than 0, which indicates that the difference between groups is significant. The reliability of statistical analysis is represented by P-value, and $P<0.05$ indicates statistical significance.

TABLE 1

Statistical Data of Target Contents obtained in Embodiment 6 (DY), Comparative Example 3 (MY) and Original Feces (F)

| Group | R-value | P-value |
| --- | --- | --- |
| DY-MY | 1 | 0.036 |
| F-MY | 1 | 0.035 |
| F-DY | 0.9896 | 0.033 |

It can be seen that the target contents (Flora) obtained by the method of the present invention have more similar species and distribution with those of the initial intestinal contents (feces), as compared with those obtained by the centrifugation. Meanwhile, the method of the present invention has better repeatability.

Embodiment 7 and Comparative Examples 4-5

The uniformly mixed intestinal contents (feces) are divided into 9 portions (100 g each portion) by weight, wherein 3 portions thereof are used in Embodiment 7, 3 portions thereof are used in Comparative Example 4, and 3 portions are used in Comparative Example 5.

Embodiment 7: the separation and recovery of intestinal contents are performed by use of the same separation and recovery device and method with Embodiment 1, the difference is only in that:

The normal saline added into the vessel 6 is 500 ml; the coarse filter mesh has a pore size of 2 mm; the fine filtration module 4 has a filter pore size of 40 μm; and the microporous membrane cross-flow disc filter 12 has a filter pore size of 0.5 μm and a porosity of 85%. Separation and recovery are completed over 60 minutes, and the resultant concentrated solution of bacteria is freeze-dried to obtain bacteria powder. The procedure is repeated for three times, and obtained 12 g, 11 g, and 12 g of powder, respectively.

Comparative Example 4 is performed by reference to Example 3 of the Chinese patent application CN201810852561.2, except that the normal saline is 500 ml, and the pore sizes of the fine filter is 0.5 mm and 40 μm from top to bottom, respectively.

Separation and recovery are completed over 120 minutes, and the resultant concentrated solution of bacteria is freeze-dried to obtain bacteria powder. The procedure is repeated for three times, and obtained 8 g, 8 g, and 7 g of powder, respectively.

Comparative Example 5 is performed by reference to Comparative Example 1, except only in that the normal saline is 550 ml, the coarse filter has a pore size of 2 mm; and the fine filter of the fine filtration module 4 has a pore size of 40 μm.

Separation and recovery are completed after 150 minutes, and the resultant concentrated solution of bacteria is freeze-dried to obtain bacteria powder. The procedure is repeated for three times, and obtained 3 g, 2 g, and 2 g of powder, respectively.

The samples obtained in Embodiment 7 and Comparative Examples 4 and 5 are determined for the average copies, which reflect number of the biological samples in samples.

The results of the average copy number/g dry powder of the samples in Embodiment 7 and Comparative Examples 4-5 are shown in Table 2.

TABLE 2

Average Copy Number/g Dry Powder

| Name of Samples | Average Copy Number/g Dry Powder | | |
| --- | --- | --- | --- |
|  | $1^{st}$ | $2^{nd}$ | $3^{rd}$ |
| Embodiment 7 | 1.46E+12 | 1.14E+12 | 3.72E+12 |
| Comparative Example 4 | 3.49E+09 | 5.20E+09 | 4.62E+09 |
| Comparative Example 5 | 1.43E+03 | 1.95E+04 | 4.46E+02 |

Figure 13:
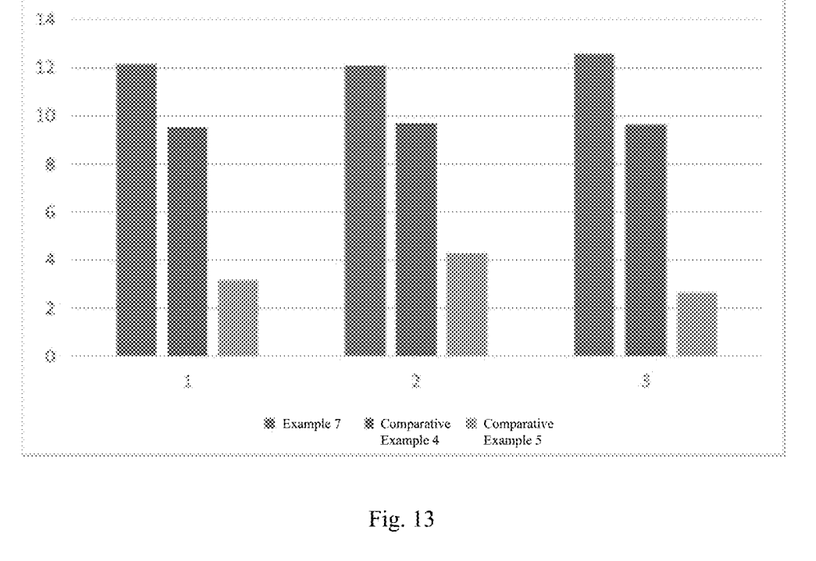
FIG. 13 is a comparison diagram of log value of the average copies per gram of dry powder of the target contents separated and recovered in Embodiment 7 and the Comparative Examples 4-5.

The logarithm of the average copy number/g dry powder in Table 2 is taken and shown in FIG. 13.

From the results of Embodiment 7 and Comparative Examples 4-5, it can be concluded that the results obtained by the method of the present invention have the same resultant magnitude, good repeatability, and high separation and recovery efficiency; can complete separation and recovery in 1 hour; and produce dry powder bacteria with high quality. As for Comparative Example 4 using a previous invention, although it has the same resultant magnitude and good repeatability, however, since the fine filtration process still adopts conventional filtration, and the nuclear pore membrane is used in the cross-flow collection, the overall separation and recovery is time-consuming, the quality of the resultant dry powder of bacteria is inferior as compared with the present invention, and the average copy number/g dry powder is lower than the present invention by three orders of magnitude. With respect to Comparative Example 5 using multi-stage conventional filtration, the results obtained thereby are significantly different, and the repeatability is very poor. The overall separation and recovery process is more time-consuming, the quality of the obtained bacteria dry powder is less, and the average copy number/g dry powder is lower than that of the present invention by more than 8 orders of magnitude.

Hereinbefore the embodiments of the present invention are described in detail. However, the description is illustrated for easy understanding and explanation, and should not be regarded as a limitation of the invention. Although the present invention is described in details by reference to the above-mentioned embodiments, those skilled in the art should understand that they can still modify the technical solutions recorded in the above-mentioned embodiments, or replace some of the technical features equally; and these modifications or substitutions are also deemed to fall within the spirit and scope of the technical solutions recorded in the above-mentioned embodiments.

We claim:

1. A device for separating rand recovering intestinal contents, characterized in that the device comprising an impurity removal module and a target content collection module; wherein the impurity removal module is configured to remove impurity from the intestinal contents, comprise a stirring coarse filtration module and a fine filtration module; said stirring coarse filtration module having a liquid inlet and reflux port, said fine filtration module comprising a fine filtration cross-flow disc filter and a liquid storage box, and the penetrating fluid filtered by the fine filtration cross-flow disc filter is passed into the liquid storage box, and then into said target content collection module, a finely penetrating fluid is refluxed via a pipe through the reflux port back into the coarse filtration module, and mixed with the penetrating fluid under the coarse filtration, whereby forming a recycling loop; the target content collection module comprises a microporous membrane cross-flow filter, the microporous membrane has a spongy porous structure with a pore size of 0.01-20 μm, the microporous membrane has a porosity of 30% or more, and the microporous membrane is a hydrophilic film; the microporous membrane cross-flow filter has a disk-like structure, and is internally provided with a spiral flow channel; the ratio of an effective filtration area of a cross-flow disk to an overall area of the cross-flow disk is 0.3-0.9; said target content collection module is connected with the liquid storage box through the pipe, concentrated liquids of said target content collection module is refluxed back into said liquid storage box through the pipe, and mixed with penetrating liquids of the fine filtration module, whereby forming another recycling loop.

2. The device of claim 1, wherein the ratio of an effective filtration area of a cross-flow disk to an overall area of the cross-flow disk is 0.4-0.8.

3. The device of claim 1, wherein a flow channel of the microporous membrane cross-flow filter is a spiral cross-flow channel.

4. The device of claim 1, wherein a cross-sectional area of a flow channel of the microporous membrane cross-flow filter is less than a cross-sectional area of an inlet pipe, and the ratio of the former to the latter is 0.8, 0.6, or 0.5, or less.

5. The device of claim 1, wherein the microporous membrane comprises one or more of polyether sulfone membrane, cellulose membrane, polymethacrylate membrane which are modified or unmodified.

* * * * *